United States Patent
Franz et al.

(10) Patent No.: US 6,496,487 B2
(45) Date of Patent: Dec. 17, 2002

(54) EFFICIENT FULL DUPLEX SIMULTANEOUS MESSAGE TRANSFER

(75) Inventors: Michael John Leonard Franz, Westland, MI (US); Kevin Mark Tiedje, Farmington Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/186,293

(22) Filed: Nov. 5, 1998

(65) Prior Publication Data

US 2001/0043567 A1 Nov. 22, 2001

(51) Int. Cl.[7] .............................................. H04L 12/28
(52) U.S. Cl. ...................................... 370/276; 709/232
(58) Field of Search ............................... 370/276, 282, 370/294, 295, 419, 420, 522; 709/208, 227, 229, 232

(56) References Cited

U.S. PATENT DOCUMENTS

| 4,750,165 A | | 6/1988 | Champagne et al. ......... 370/24 |
| 4,949,359 A | | 8/1990 | Voillat ........................ 375/106 |
| 5,007,050 A | * | 4/1991 | Kasparian et al. .......... 370/280 |
| 5,121,382 A | | 6/1992 | Yang et al. .................... 370/31 |
| 5,454,085 A | | 9/1995 | Gajjar et al. ................. 395/285 |
| 5,475,860 A | | 12/1995 | Ellison et al. ............... 395/846 |
| 5,928,345 A | * | 7/1999 | Tetzlaff et al. .............. 710/107 |

* cited by examiner

*Primary Examiner*—Min Jung
(74) *Attorney, Agent, or Firm*—John Kajander

(57) ABSTRACT

A method is provided for transferring message data between stations of a communications network where the network has plurality of interconnected stations with each station having a microprocessor, data storage means for storing message data and a peripheral device providing an interface for the station to facilitate transmission and reception of messages along the network with a predetermined network protocol. The method includes initiating a transaction between the microprocessor and the peripheral device, transferring a command code from the microprocessor to the peripheral device, sending a status signal from the peripheral device to the microprocessor in response to receiving the command code, sending transmission data from the microprocessor to the peripheral device for output to the network, and sending any data stored in the data storage means from the peripheral devices to the microprocessor. The first byte of the microprocessor message contains a command signal and the remaining bytes contain transmission data or dummy data. The message protocol associated with the method supplants any existing serial peripheral interface protocol.

19 Claims, 2 Drawing Sheets

EFFICIENT FULL DUPLEX SIMULTANEOUS MESSAGE TRANSFER

FIELD OF THE INVENTION

The present invention relates to message transfer between digital data processing stations interconnected by a communications network. More particularly, the invention discloses a method for simultaneous message transfer between the station processor and the station interface component.

BACKGROUND OF THE INVENTION

Dramatic growth in the use of microprocessor based devices has led to communications networks allowing for the interconnection of many such devices to facilitate communication between the devices. A typical network, such as a local area network (LAN), includes a number of microprocessor devices or stations which are interconnected by a number of communication channels or links. Some of the devices or "stations" may be "half-duplex" stations meaning that they are capable of transmitting and receiving data, but cannot transmit and receive data simultaneously. Other stations are "full-duplex" stations which are capable of transmitting and receiving data at any given time or simultaneously transmitting and receiving data.

Typically, communication between stations interconnected by a network is accomplished through a peripheral communication device. This device acts as an interface between the host microprocessor of the station and the larger communications network. Depending on the network protocol, the data communicated on this network often takes the form of a message. The peripheral device, acting as a communication interface, must be capable of receiving and storing message data for the station from the network, and transmitting message data from the station onto the network. All information transmitted and received on the network must conform to a preestablished protocol. Messages are transmitted in frames of uniform format, each frame comprising a number of fields each having a predefined location and meaning.

The interface between the station microprocessor and the peripheral communication device is often implemented using a serial peripheral interface (SPI). The SPI typically uses four connections between the microprocessor and the peripheral communication device to accomplish the transmission and reception of network message data. While this arrangement is generally satisfactory, the efficiency of such an arrangement is compromised due to the excessive amount of time spent by the station microprocessor servicing the SPI. Accordingly, it will be appreciated that it would be highly desirable to provide a method which allows for efficient full duplex communications between stations on the network by simplifying message transfer between the station microprocessor and the SPI.

SUMMARY OF THE INVENTION

The present invention is directed to overcoming one or more of the problems set forth above. Briefly summarized, according to one aspect of the present invention, a method for more efficient full duplex communication between stations on a communication network is provided. The method allows for simultaneous initiation of network message transmission from the station microprocessor to the peripheral device while reading a stored received network message transmission from the peripheral device to the microprocessor in a single serial transfer. The method has particular application to several scenarios which typically occur during message transfer between stations on the network.

The present invention provides efficient full duplex communications between stations on the network. It provides a method which allows for simultaneous initiation of network message transmission from the station microprocessor to the peripheral device while reading a stored received network message transmission from the peripheral device to the microprocessor in a single serial transfer. It provides a network communication method which reduces the amount of time spent servicing the peripheral device by the station microprocessor. This method is particularly applicable for four commonly encountered scenarios. The first scenario occurs when a transaction, i.e., an outgoing message intended for other stations on the network, is initiated by a station microprocessor with a network received message stored in the peripheral device. The second scenario occurs when a transaction is initiated by a station microprocessor without a network received message stored in the peripheral device. The third scenario occurs when a dummy message transmission is initiated by the host processor and a network received message is stored in the peripheral device, and the fourth scenario occurs when a dummy transmission is initiated by the host processor and a network received message is not stored in the peripheral device.

The message protocol associated with the method supplants any existing SPI protocol. The message format is byte oriented, with the first byte of the microprocessor message containing command signals and the remaining bytes containing transmission data or dummy data. The byte oriented message stored in the peripheral device, which has been received from the network, includes a first byte containing a status signal with the remaining bytes containing received data or dummy data. The message received from the network is translated from the network protocol to the message protocol used for exchanging messages between the peripheral device and the microprocessor. Dummy data is periodically transmitted by the microprocessor in order to check the status of the peripheral device and to retrieve any data stored therein. Likewise, if a transmission is initiated by the microprocessor and there is no received data stored in the peripheral device, dummy data is sent to the microprocessor.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
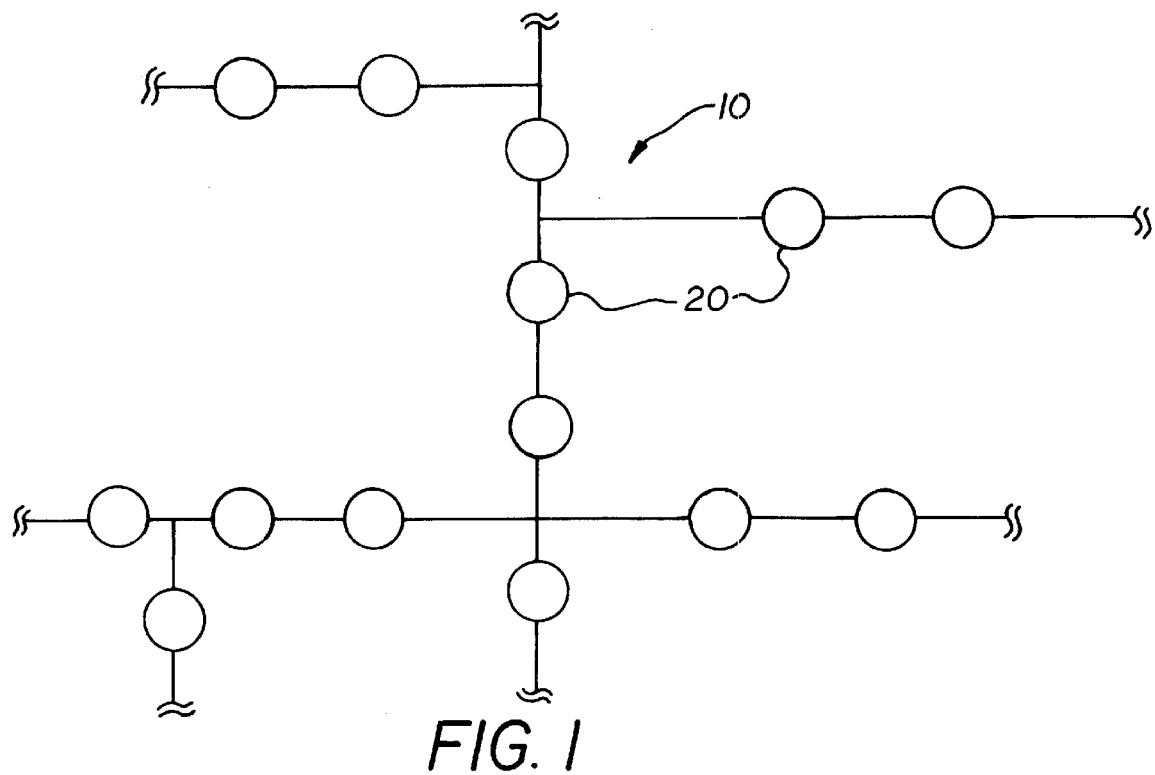
FIG. 1 is a diagram of a communication network having a plurality of full duplex stations.
Figure 2:
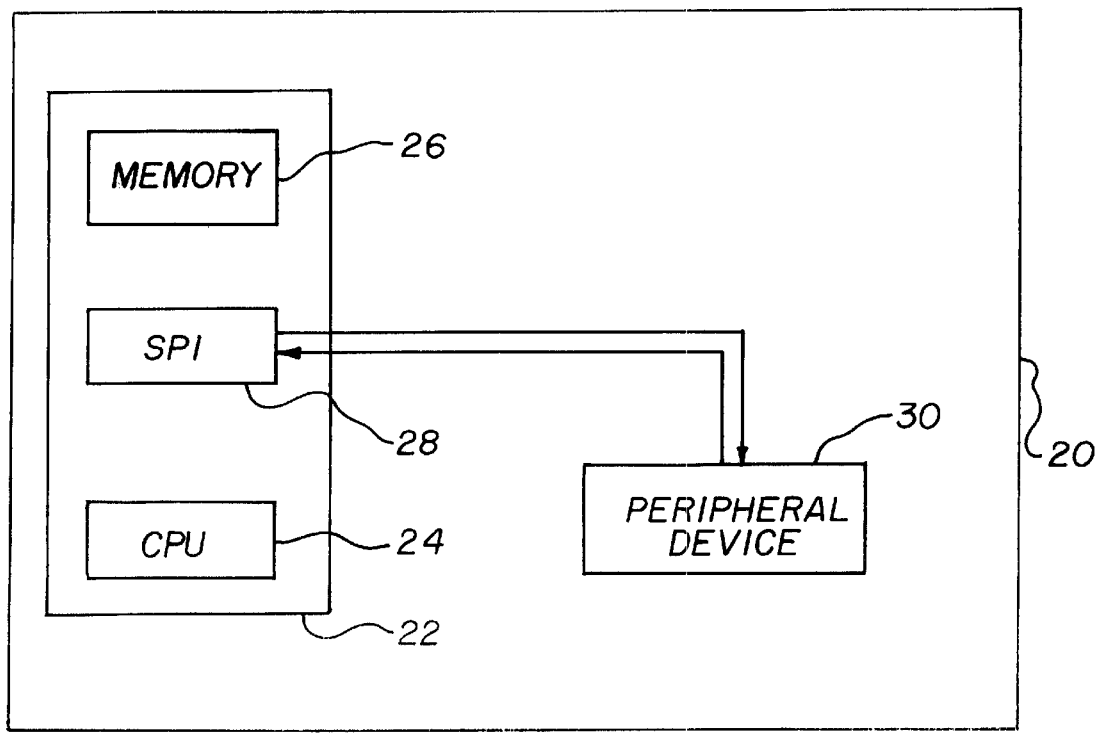
FIG. 2 is a diagram illustrating a single full duplex station.
Figure 3:
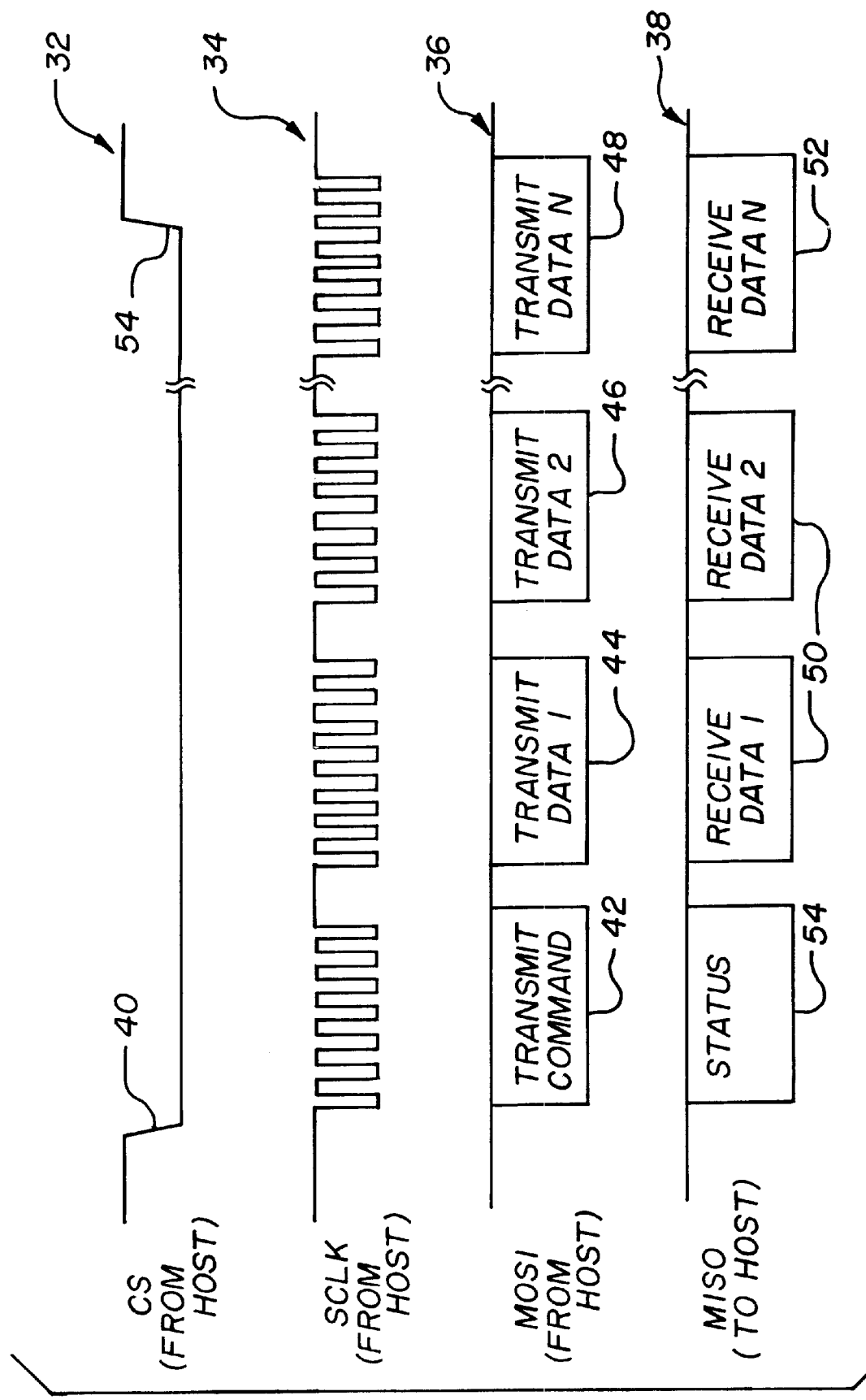
FIG. 3 depicts the protocol for message transmission between the station microprocessor and the station peripheral device.

Referring to FIGS. 1–3, a communications network, generally indicated by the numeral 10, having a plurality of interconnected stations 20 is shown. Each station 20 includes several functional components including a microprocessor 22, the microprocessor 22 having a CPU 24, a memory 26, and a serial peripheral interface (SPI) 28 which allows the station 20 to control various devices which may be connected thereto. It should be understood that other components may be included in addition to or in substitution for the components shown. In general, the hardware components depicted in FIG. 2 represent commercially available electronic devices which may be readily purchased from any of a number of sources.

In order to communicate on the network 10, the station 20 requires a communication interface such as peripheral device 30. The peripheral device 30 must be capable of receiving and storing message data which is passed along the network, as well as transmitting messages from the microprocessor 22 onto the network in accordance with the network protocol. The SPI 28 is the connection between the microprocessor 22 and the peripheral device 30. The SPI 28 typically uses four connections: MOSI, MISO, SCLK and CS. MOSI is a microprocessor to peripheral protocol. MISO is a peripheral to microprocessor protocol. SCLK is the clock signal and CS is chip enable.

The conventional function of the stations 20, among other things, is to send and receive messages which are transmitted along the network. Frequently, this communication requires multiple data transfers between the microprocessor 22 and the peripheral device 30. In conventional systems, when a transmission is initiated by the microprocessor 22, the transmission data is transferred through the SPI 28 to the peripheral device 30 for output onto the network. If there is any data stored in the peripheral device 30 it is not transferred to the microprocessor 22 until a command signal is received from the microprocessor 22 requesting either the status of the peripheral device 30 or the transfer of any received data to the microprocessor 22. When data is received by the peripheral device 30, it is stored there until a command signal is sent by the microprocessor 22 requesting that any stored network data be transferred to the microprocessor 22. These data transfers are time consuming and ultimately impede the transmission and reception of message data along the network.

Full duplex communication along the network 10 can be greatly improved using the method of the present invention. In accordance with the method of the invention, each time a transaction is initiated by the microprocessor 22, it checks the status of the peripheral device 30 and receives any stored data which may be present in the peripheral device. A message format for accomplishing this task is shown in FIG. 3. It should be noted that this format is employed for exchanging messages between the microprocessor 22 and the peripheral device 30. The peripheral device 30 converts incoming messages from the network protocol or format for messages.

There are four scenarios typically encountered by stations 20 communicating on the network 10. The first scenario occurs when a transaction is initiated by the station microprocessor 22 with a network received message stored in the peripheral device 30. The second scenario occurs when a transaction is initiated by a station microprocessor 22 without a network received message stored in the peripheral device 30. The third scenario occurs when a dummy message transmission is initiated by the microprocessor 22 and a network received message is stored in the peripheral device 30, and the fourth scenario occurs when a dummy transmission is initiated by the microprocessor 22 and a network received message is not stored in the peripheral device 30.

The message format for the four scenarios is illustrated in FIG. 3. In the first scenario, the messages are exchanged as a series of 8-bit or byte long blocks. The first byte sent by the microprocessor 22 contains a transmit command code to the peripheral device 30 indicating that a transmission has been initiated by the microprocessor. The peripheral device 30 sends a status signal indicating that there is stored message data received from the network. Bytes 2 through n of the data transfer from the microprocessor 22 to the peripheral device 30 contain the transmission data for transmission onto the network 10. Peripheral device 30 translates the transmission data into a format recognizable on the network. Bytes 2 through n of the data transfer from the peripheral device 30 to the microprocessor 22 contain the stored message data which is also formatted in accordance with the network protocol. The status signal sent by the peripheral device 30 is sent during the same clock cycle as the transmit command code sent by the microprocessor 22 and thus the message transfer from the microprocessor 22 to the peripheral device 30 is essentially simultaneous.

In the second scenario, no network data is pending in the peripheral device 30. Byte 1 of the data transfer from the microprocessor 22 to the peripheral device 30 contains a transmit command indicating that a transmission has been initiated by the microprocessor 22 as in the prior scenario. Bytes 2 through n contain the transmission data, which is formatted in accordance with the network protocol, to be forwarded for transmission onto the network 10. Byte 1 from the peripheral device is the status byte that indicates a received message. Bytes 2 through n of the data transfer from the peripheral device 30 to the microprocessor 22 contain dummy data since there is no data currently stored in the peripheral device 30.

Scenarios 3 and 4 have protocols that cover the situations where the microprocessor 22 initiates a transaction for the sole purpose of determining if there is data pending in the peripheral device 30. Byte 1 of the data transfer to the peripheral device 30 contains a dummy command. The dummy command initiates the transmission of a status signal from the peripheral device 30, followed by the pending data which is stored in the peripheral device. If there is no pending data stored in the peripheral device 30, then no additional data is transferred. If the status byte indicates there are n bytes of data stored in the peripheral device 30 then n bytes of dummy data are transferred from the microprocessor 22.

Still referring to FIG. 3, a number of host/peripheral interface signal lines are depicted over time including a chip select (CS) line 32 from the host to the peripheral, a serial clock line (SCLK) 34 originating from the host, a unidirectional data line (MOSI) 36 from the host to the peripheral, and a unidirectional data line (MISO) 38 from the peripheral to the host. This represents a typical SPI interface.

FIG. 3 illustrates data transfers occurring in accordance with the protocol of the present invention. When chip select (CS) 40 transitions to low, i.e. when chip select is activated, the internal clock 34 of the SPI is activated (for 8 cycles in this instance). The CS signal is sent by the microprocessor at the start of a message transfer between the microprocessor and the peripheral communication device. Activation of the clock 34 initiates transmission of the first data byte, command byte 42, from the microprocessor to the peripheral device. Simultaneous with the transfer of the command byte 42 between the microprocessor and the peripheral device, the peripheral device transmits a status byte 55 to the microprocessor. Bit D7 of the status byte indicates whether there are stored network received data in the peripheral device.

If the microprocessor sends a dummy command byte 42 as the first byte after the fall of CS 40, and D7 of the received status byte 55 indicates no received message in the peripheral device, the command is terminated by raising chip select 54.

If the microprocessor sends a transmit command 42, and D7 indicates there is no network received message in the peripheral device, the microprocessor continues to send the complete command transmit data bytes 42, 44, 46, and 48, while simultaneously receiving dummy data 50, 52 from the peripheral device. For each data byte sent one dummy byte is returned.

If the microprocessor sends a dummy command bytes 42 to check the received message status, and D7 of the status byte 55 indicates that a network received message is pending, the microprocessor continues to send n number of dummy command bytes until the complete received message is read from the peripheral device. The status byte 55, being the first byte transferred, indicates in its bits D2, D1 and D0 the length of the received message.

If the microprocessor sends a transmit command 42, and D7 of the status byte 55 indicates there is a network received message pending, the microprocessor will continue to send the complete transmit command 42 and transmit data bytes 44, 46, and 48 of bytes of the message to be transmitted on the network 10 while simultaneously receiving the network message stored in the peripheral device. If the received message is longer in length (number of bytes) than the transmitted message as indicated by the status byte 55, the microprocessor will append dummy bytes to the end of the transmit command until the complete message is read from the peripheral device. The command byte 42 indicates to the peripheral device how many bytes are in the actual message and where n dummy bytes start. If the network received message is shorter as measured by the number of bytes than the transmit message, the microprocessor terminates the transaction after the last transmit byte 48 is clocked out on the SPI by raising chip select 54.

The essence of the invention is that the microprocessor can both send a transmit command to the peripheral device while simultaneously reading and clearing the peripheral device's network receive: buffer. Prior to the present invention, a command would have to be sent to initiate a network message transmission and a separate command would have to be sent to read the peripheral receive buffer. The present invention permits both operations to occur simultaneously.

It can now be appreciated that a method has been presented for transferring message data between stations of a communications network where the communications network has a plurality of interconnected stations with each of the stations having a microprocessor and a peripheral device. The method includes initiating transfer of transmission data from one of the stations onto the network by sending a control signal from the microprocessor to the peripheral device, acknowledging receipt of the signal by sending a status signal from the peripheral device to the microprocessor, and transferring the transmission data from the microprocessor to the peripheral device for output onto the network while simultaneously transferring received data stored in the peripheral device for input to the microprocessor. The method also includes indicating whether data received from the network is stored in the peripheral device with a status signal, and transferring the transmission data and the received data in 8-bit blocks.

The message protocol associated with the method supplants any existing SPI protocol. The first byte of the microprocessor message contains a command signal and the remaining bytes contain transmission data or dummy data. The byte oriented message stored in the peripheral device, which has been received from the network, includes a first byte containing a status signal with the remaining bytes containing received data or dummy data. The message received from the network is translated from the network protocol to the message protocol used for exchanging messages between the peripheral device and the microprocessor. Dummy data is periodically transmitted by the microprocessor in order to check the status of the peripheral device and to retrieve any data stored therein. Likewise, if a transmission is initiated by the microprocessor and there is no received data stored in the peripheral device, dummy data is sent to the microprocessor.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A method for transferring message data between stations of a communications network, said communications network having a plurality of interconnected stations with each of said stations having a microprocessor and an associated peripheral device, said method comprising the steps of:
   activating said associated peripheral device by sending a chip select signal from said station's microprocessor to said associated peripheral device;
   initiating transfer of multiple blocks of transmission data from one of said stations onto said network only by sending a control signal from said station's microprocessor to said associated peripheral device;
   sending a status signal from said associated peripheral device to said station's microprocessor; and
   transferring said multiple blocks of transmission data from said station's microprocessor to said associated peripheral device in a single serial transfer during a single cycle of said chip select signal for output onto said network while transferring multiple blocks of received data stored in said associated peripheral device in a single serial transfer during said single cycle of said chip select signal for input to said microprocessor.

2. The method of claim 1 including the step of indicating whether data received from the network is stored in said peripheral device with a status signal.

3. The method of claim 1 including the step of transferring said transmission data and said received data in 8-bit blocks.

4. The method of claim 1 including the steps of:
   transferring said transmission data and said received data in multibit blocks; and
   including a transmit command code in an initial one of said multibit blocks of the transmission data.

5. The method of claim 1 including the steps of:
   transferring said transmission data and said received data in multibit blocks; and
   including a status bit in an initial one of said multibit blocks of the received data.

6. A method for transferring message data between stations of a communications network, said communications network having a plurality of interconnected stations with each of said stations having a microprocessor and an associated peripheral device, said microprocessor having a serial peripheral interface, said method comprising the steps of:

provided activating said associated peripheral device by sending a chip select signal from said station's microprocessor to said associated peripheral device;

initiating transfer of transmission data from one of said stations onto said network only by sending a control signal from said station's microprocessor through said serial peripheral interface to said associated peripheral device during a single cycle of said chip select signal;

sending a status signal from said associated peripheral device through said serial peripheral interface to said station's microprocessor during said single cycle of said chip select signal; and transferring said transmission data from said station's microprocessor through said serial peripheral interface to said associated peripheral device in a single serial transfer during said single cycle of said chip select signal for output onto said network while transferring received data stored in said associated peripheral device through said serial peripheral interface in a single serial transfer during said single cycle of said chip select signal for input to said microprocessor.

7. The method of claim 6 including the step of indicating whether data received from the network is stored in said peripheral device with a status signal.

8. The method of claim 6 including the step of transferring said transmission data and said received data in 8-bit blocks.

9. The method of claim 6 including the steps of:
transferring said transmission data and said received data in multibit blocks; and
including a transmit command code in an initial one of said multibit blocks of the transmission data.

10. The method of claim 9 including the step of including a status bit in an initial one of said multibit blocks of the received data.

11. A method for transferring message data between stations of a communications network, said communications network having a plurality of interconnected stations, each of said stations having a processor, data storage means for storing message data and a peripheral device providing an interface for said station to facilitate transmission and reception of messages along said communications network with a predetermined network protocol, said method comprising the steps of:

activating said associated peripheral device by sending a chip select signal from said station's microprocessor to said associated peripheral device;

initiating a transaction between said processor and said peripheral device only by transferring a command code from said processor to said peripheral device;

sending a status signal from said peripheral device to said station processor;

sending transmission data from said processor to said peripheral device in a single serial transfer during a single cycle of chip select signal for output to said network; and sending any data stored in said data storage means from said peripheral devices to said processor in a single serial transfer during said single cycle of chip select signal with said transmission data.

12. The method of claim 11 including the step of indicating whether data received from the network is stored in said peripheral device with a status signal.

13. The method of claim 11 including the step of transferring said transmission data and said received data in 8 bit blocks.

14. The method of claim 13 including the step of including a transmit command code in an initial one of said 8-bit blocks of the transmission data.

15. The method of claim 13 including the step of including a status bit in an initial one of said 8-bit blocks of the received data.

16. The method of claim 11 including the step of including a transmit code in said command code.

17. The method of claim 11 including the step of including a dummy code in said command code.

18. The method of claim 11 including the step of receiving data from said network and storing said data in said peripheral device.

19. The method of claim 11 including the step of receiving dummy data from said network and storing said dummy data in said peripheral device.

* * * * *